March 31, 1959 H. E. VAUGHAN 2,880,317
ELECTRICAL IMPULSE RESPONSIVE NETWORK
Filed April 15, 1955

INVENTOR
H. E. VAUGHAN
BY James D. Falk
ATTORNEY

United States Patent Office 2,880,317

Patented Mar. 31, 1959

2,880,317

ELECTRICAL IMPULSE RESPONSIVE NETWORK

Henry E. Vaughan, Chatham, N.J., assignor to Bell Telephone Laboratories, Incorporated, New York, N.Y., a corporation of New York Application April 15, 1955, Serial No. 501,471

2 Claims. (Cl. 250—27)

Figure 1:
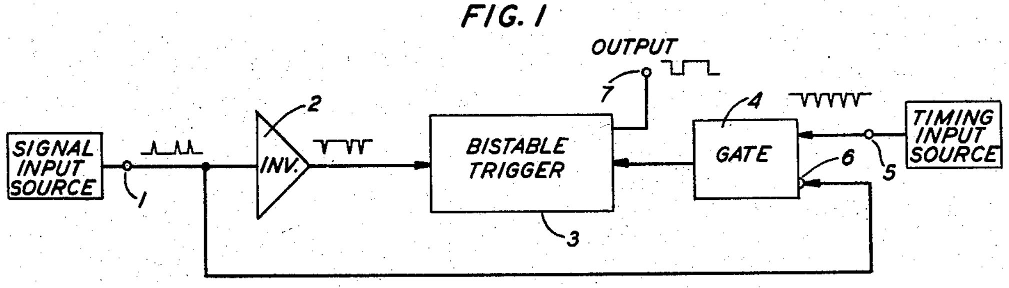

This invention relates to impulse responsive networks and more particularly to impulse responsive networks of the type which deliver at their outputs signals having durations determined by a property of the signals applied to such networks.

For applications such as pulse time communication systems, television, radio and other types of pulse information processing systems, it frequently is desirable to respond to actuating signals with output signals of a definite and recognizable duration greater than the actuating signal. For example, in some types of pulse code modulation systems, it is advantageous to generate a rectangular output pulse under the control of input pulses wherein the duration of the output pulse is determined by a property of the input pulses, such as the number of consecutive input pulses.

It is an object of this invention to provide an improved impulse responsive network for generating an output signal having a duration which is controlled by a property of the input signal. More specifically, it is an object of this invention to provide an impulse responsive network wherein the duration of the output pulse is determined by a number of consecutive input pulses.

It is a further object of this invention to provide such an impulse responsive network which utilizes comparatively few components and thus is relatively inexpensive to manufacture and operate.

These and other objects are realized in a specific illustrative embodiment of this invention which comprises a bistable trigger circuit having set and reset terminals and a gate having both enabling and inhibiting inputs. The trigger circuit is generally conventional and is operated to one of its two stable states by the application of a signal pulse to its set terminal and is reset to its other stable state by the application of a clock pulse, which first must pass through the gate, to its reset terminal. The signal and clock pulses are synchronized so that when a signal pulse occurs it is applied to the network in the same time interval as a clock pulse. Each signal pulse, in addition to being applied to the trigger circuit input terminal, is also applied to the inhibiting input of the gate such that the coincident arrival of a clock pulse and a signal pulse at the gate blocks the gate and prevents the clock pulse from resetting the trigger circuit. Thus, the clock pulses are applied through the gate to reset the trigger circuit only when a signal pulse is not present. As a result, the trigger circuit will remain in its operated state for as many time intervals as are marked by consecutive signal pulses.

In accordance with a feature of this invention, a bistable trigger circuit is set in its operated state by a signal pulse and remains in this state for a time interval determined by the number of consecutive signal pulses.

It is a further feature of this invention that the trigger circuit be reset by clock pulses only at such times when a signal pulse is not present.

It is a still further feature of this invention that a gating circuit having both an enabling input and an inhibiting input be connected to the bistable trigger circuit to block the clock pulses from resetting the trigger circuit when a signal pulse arrives at the gate coincident in time with the clock pulses.

Figure 2:
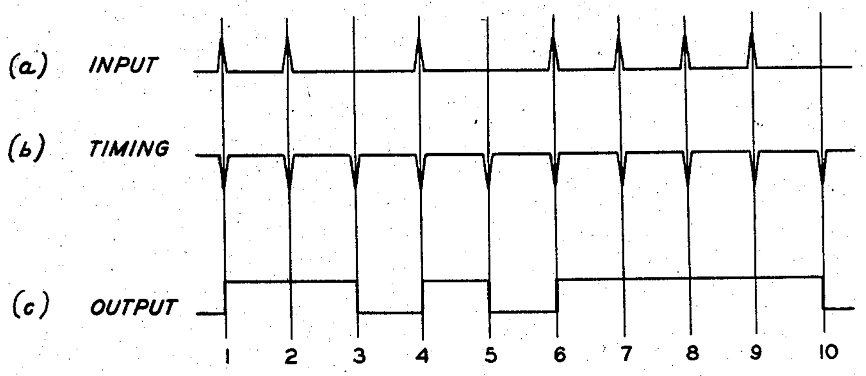
Figure 3:
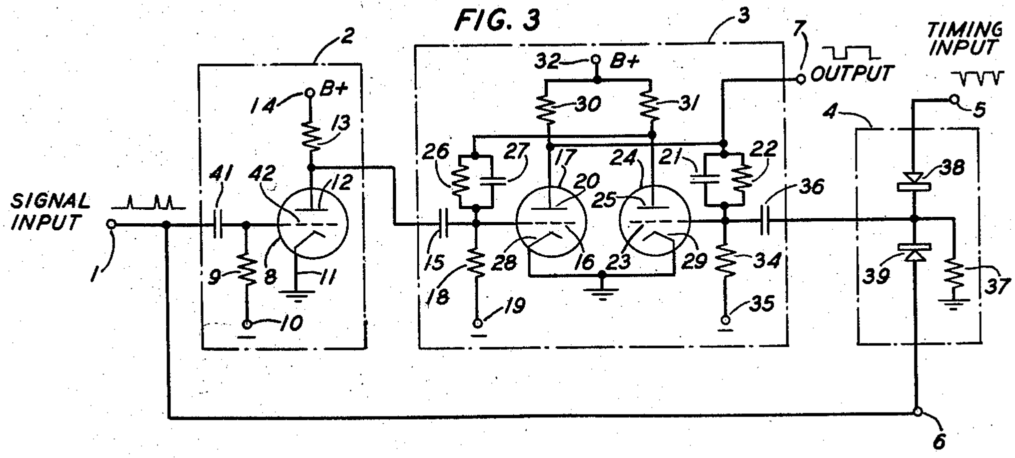

A complete understanding of this invention, together with the above noted and other features thereof, may be gained from consideration of the following detailed description and the accompanying drawing, in which:

Fig. 1 is a block diagram representation illustrative of one embodiment of the invention;

Fig. 2 portrays a series of wave forms illustrating the operation of a network constructed in accordance with the invention; and Fig. 3 is a schematic diagram of one illustrative embodiment of the invention as depicted in Fig. 1.

Referring now to the drawing, the circuit shown in block diagram form in Fig. 1 comprises an input terminal 1 to which signal pulses are applied, an inverter circuit 2 connected to the input terminal 1 for reversing the polarity of the signal pulses, a bistable trigger circuit 3 connected to the inverter circuit 2, and a gate 4 connected to the trigger circuit 3. The gate 4 has an enabling input terminal 5 to which the clock pulses are applied from a timing source and an inhibiting input terminal 6 to which the signal pulses are applied from the input terminal 1.

In the operation of the embodiment of the invention shown in Fig. 1, a positive signal pulse applied to the input terminal 1 is inverted and applied as a negative pulse to the bistable trigger circuit 3 to operate it to one of its stable states. The positive signal pulses also will be applied to the inhibiting terminal 6 of gate 4 to block the gate and prevent a clock pulse from reaching the trigger circuit. After the first signal pulse has operated trigger circuit 3, successive signal pulses have no effect for as long as the trigger circuit remains operated. In the first time slot in which a signal pulse is absent, gate 4 will be unblocked and a clock pulse will pass through the gate to restore trigger circuit 3 to its unoperated state. Thus, trigger circuit 3 is set by a signal pulse and remains operated for as many time intervals as are marked by successive signal pulses. It is reset only in the time slot in which there is no signal pulse. The output signals, which advantageously are taken from an electrode of the trigger circuit 3 at the output terminal 7, then comprise a series of rectangular pulses, the duration of which corresponds to the lengths of the groups of successive signal pulses.

The above-described operation is shown more clearly by the wave forms of Fig. 2. Fig. 2(*a*) illustrates a representative series of signal pulses in which such pulses are depicted as being present in the first, second, fourth and sixth through ninth time slots and as being absent in the third, fifth and tenth time slots. Fig. 2(*b*) shows the clock pulses which are applied from any timing source known in the art to the gate, there being a clock pulse for every time slot. Fig. 2(*c*) shows the resultant output rectangular pulses which are taken from output terminal 7 of the bistable trigger circuit 3. A comparison of the wave forms of Fig. 2 shows that the output pulse has an initial duration of two time slots, as there are two consecutive signal pulses during this period and the clock pulses are blocked by gate 4 from resetting the trigger circuit. There is no output pulse during the third time slot as the absence of a signal pulse at this time has enabled a clock pulse to pass through the unblocked gate and reset the trigger circuit. The trigger circuit is again set to its operating state and produces an output pulse during the fourth time slot, but is reset during the fifth time slot due to the absence of a signal pulse at this time. An output pulse is present during the sixth, seventh, eighth and ninth time slots due to the presence of four successive signal pulses at these times. The trigger circuit 3 is reset in the tenth time slot by a clock pulse.

Although it will be understood by those skilled in the art that the component circuits comprising the blocks of Fig. 1 are in no way limited to any specific circuit elements and may comprise vacuum tube, semiconductor, magnetic or ferroelectric elements, for the purpose of illustration a specific embodiment of the invention is shown in Fig. 3 of the drawing. The signal input terminal 1 is connected to an inverter 2 which comprises a capacitance 41 connected to the control electrode 42 of a space discharge device 8. The control electrode 42 is also connected through a resistance 9 to a source of bias potential 10. The cathode 11 is connected to ground and the anode 12 is connected through a resistance 13 to a source of positive potential 14 and to a capacitance 15 of the bistable trigger circuit 3. The capacitance 15 is connected to the control electrode 16 of the space discharge device 17 and through a resistance 18 to a source of bias potential 19.

The anode 20 of the space discharge device 17 is connected through the parallel combination of capacitance 21 and resistance 22 to the control electrode 23 of a space discharge device 24. Similarly, the anode 25 of the space discharge device 24 is connected through the parallel combination of the resistance 26 and a capacitance 27 to the control electrode 16 of the space discharge device 17. The cathode 28 of the space discharge device 17 and the cathode 29 of the space discharge device 24 are each connected to ground. The anodes 20 and 25 of the two space discharge devices are connected through resistances 30 and 31, respectively, to a source of anode potential 32. Anode 20 of space discharge device 17 is also connected to an output terminal 7.

The control electrode 23 of space discharge device 24 is connected through a resistance 34 to a source of bias potential 35 and through a capacitance 36 to a resistance 37 of the gate 4. Resistance 37 is connected to the junction of a pair of series opposed diodes 38 and 39 at one of its terminals and to ground at the other of its terminals. Diode 38 is connected to the enabling input 5 of gate 4 to which is applied the clock pulses. Diode 39 is connected through the inhibiting input 6 to the input signal terminal 1.

It is to be understood that the above-disclosed arrangements are merely illustrative of the application of the principles of the invention. Numerous other arrangements may be devised by those skilled in the art without departing from the spirit and scope of the invention.

What is claimed is:

1. An electrical circuit for generating electrical impulses each having a duration determined by the number of consecutive signal pulses applied thereto comprising a bistable trigger circuit having a pair of input terminals, a source of signal pulses, means connecting said source of signal pulses to one of said input terminals for operating said trigger circuit to one stable state, inhibiting gate means connected to the other of said input terminals, said inhibiting gate means having an enabling input terminal and an inhibiting input terminal, a source of reset pulses connected to said enabling input terminal for operating said trigger circuit to its other stable state, and means connecting said source of input signals to said inhibiting input terminal for causing said inhibiting gate means to inhibit said reset pulses on occurrence of said signal pulses, whereby said trigger circuit is maintained in said one stable state for a period of time determined by the consecutive number of said signal pulses.

2. An electrical circuit in accordance with claim 1 wherein said means connecting said source of signal pulses to said one input terminal of said bistable trigger circuit comprises pulse inverting means.

References Cited in the file of this patent

UNITED STATES PATENTS

| | | |
|---|---|---|
| 2,086,918 | Luck | July 13, 1937 |
| 2,536,808 | Higinbotham | Jan. 2, 1951 |
| 2,553,284 | Sunstein | May 15, 1951 |
| 2,577,827 | Tompkins | Dec. 11, 1951 |
| 2,709,747 | Gordon et al. | May 31, 1955 |
| 2,719,228 | Auerbach et al. | Sept. 27, 1955 |
| 2,723,080 | Curtis | Nov. 8, 1955 |
| 2,756,329 | Lubkin | July 24, 1956 |
| 2,802,940 | Burton | Aug. 13, 1957 |